(12) United States Patent
Lapstun et al.

(10) Patent No.: US 7,369,265 B1
(45) Date of Patent: May 6, 2008

(54) PRINTER WITH CODE SENSOR

(75) Inventors: Paul Lapstun, Rodd Point (AU); Kia Silverbrook, Balmain (AU); Simon Robert Walmsley, Epping (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 602 days.

(21) Appl. No.: 09/693,514

(22) Filed: Oct. 20, 2000

(30) Foreign Application Priority Data

Dec. 1, 1999 (AU) .................................... PQ4392

(51) Int. Cl.
*G06F 15/00* (2006.01)
*G06K 1/00* (2006.01)

(52) U.S. Cl. ..................................... 358/1.18; 358/1.17

(58) Field of Classification Search ............... 358/1.15, 358/1.1, 1.9, 1.11–1.18; 382/182–183
See application file for complete search history.

(56) References Cited

U.S. PATENT DOCUMENTS

| | | | |
|---|---|---|---|
| 3,978,964 A | 9/1976 | Kwan | |
| 4,864,618 A | 9/1989 | Wright et al. | |
| 5,051,736 A | 9/1991 | Bennett et al. | |
| 5,477,012 A | 12/1995 | Sekendur | |
| 5,652,412 A | 7/1997 | Lazzouni | |
| 5,661,506 A | 8/1997 | Lazzouni | |
| 5,692,073 A | 11/1997 | Cass | |
| 5,852,434 A | 12/1998 | Sekendur | |
| 6,072,871 A * | 6/2000 | Ur | 380/51 |
| 6,076,734 A | 6/2000 | Dougherty et al. | |
| 6,078,400 A * | 6/2000 | Mizutani | 358/1.14 |
| 6,137,590 A * | 10/2000 | Mori | 358/1.17 |
| 6,330,976 B1 * | 12/2001 | Dymetman et al. | 235/487 |
| 6,335,978 B1 * | 1/2002 | Moscato et al. | 382/112 |
| 6,537,324 B1 * | 3/2003 | Tabata et al. | 715/513 |
| 6,563,601 B1 * | 5/2003 | Yamada et al. | 358/1.9 |
| 6,964,374 B1 | 11/2005 | Djuknic et al. | |

FOREIGN PATENT DOCUMENTS

| | | |
|---|---|---|
| EP | 0940768 | 9/1999 |
| GB | 2227718 | 8/1990 |
| GB | 2 306 669 | 5/1997 |
| JP | 09109504 | 4/1997 |
| WO | WO 92/00194 | 1/1992 |
| WO | WO 99/18487 | 4/1999 |
| WO | WO 99/50787 | 10/1999 |

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

* cited by examiner

*Primary Examiner*—Gabriel I. Garcia
*Assistant Examiner*—Thierry L. Pham

(57) ABSTRACT

A printer for printing user information is provided with one or more sensors for detecting machine-readable information pre-printed or pre-formed on the substrate printed upon. The information uniquely identifies each substrate from other substrates and this information is associated with information relating to the user information. Use of pre-printed or pre-formed substrates allows use of any printing technology.

39 Claims, 7 Drawing Sheets

PRINTER WITH CODE SENSOR

FIELD OF INVENTION

This invention relates to the use of substrates that carry machine-readable data relating to the identification of the substrate, and more particularly to paper substrates that are printed on. However, the invention is applicable for use on substrates other than paper. Whilst reference is made to paper in the specification it is to be understood that the invention is not limited to paper.

CO-PENDING APPLICATIONS

Various methods, systems and apparatus relating to the present invention are disclosed in the following co-pending applications filed by the applicant or assignee of the present invention simultaneously with the present invention:

| | | | | | |
|---|---|---|---|---|---|
| 09/693415 | 7110126 | 6813558 | 6965454 | 6847883 | 09/693647 |
| 09/693690 | 6982798 | 6474888 | 6627870 | 6724374 | 09/693514 |
| 6454482 | 6808330 | 6527365 | 6474773 | 6550997 | |

The disclosures of these co-pending applications are incorporated herein by cross-reference.

Various methods, systems and apparatus relating to the present invention are disclosed in the following co-pending applications filed by the applicant or assignee of the present invention on 15 Sep. 2000:

| | | | |
|---|---|---|---|
| 6679420 | 6963845 | 6995859 | 6720985 |

The disclosures of these co-pending applications are incorporated herein by cross-reference.

Various methods, systems and apparatus relating to the present invention are disclosed in the following co-pending applications filed by the applicant or assignee of the present invention on 30 Jun. 2000:

| | | | | | |
|---|---|---|---|---|---|
| 6824044 | 6678499 | 6976220 | 6976035 | 6766942 | 09/609303 |
| 6922779 | 6978019 | 09/607843 | 6959298 | 6973450 | 09/609553 |
| 6965882 | 09/608022 | 7007851 | 6957921 | 6457883 | 6831682 |
| 6977751 | 6398332 | 6394573 | 6622923 | | |

The disclosures of these co-pending applications are incorporated herein by cross-reference.

Various methods, systems and apparatus relating to the present invention are disclosed in the following co-pending applications filed by the applicant or assignee of the present invention on 23 May 2000:

| | | | | | |
|---|---|---|---|---|---|
| 6428133 | 6526658 | 6315399 | 6338548 | 6540319 | 6328431 |
| 6328425 | 6991320 | 6383833 | 6464332 | 6390591 | 7018016 |
| 6328417 | 09/575197 | 7079712 | 09/575123 | 6825945 | 09/575165 |
| 6813039 | 6987506 | 7038797 | 6980318 | 6816274 | 7102772 |
| 09/575186 | 6681045 | 6728000 | 09/575145 | 7088459 | 09/575181 |
| 7068382 | 7062651 | 6789194 | 6789191 | 6644642 | 6502614 |
| 6622999 | 6669385 | 6549935 | 6987573 | 6727996 | 6591884 |
| 6439706 | 6760119 | 09/575198 | 6290349 | 6428155 | 6785016 |
| 6870966 | 6822639 | 6737591 | 7055739 | 09/575129 | 6830196 |
| 6832717 | 6957768 | 09/575162 | 09/575172 | 09/575170 | 7106888 |
| 09/575161 | 6409323 | 6281912 | 6604810 | 6318920 | 6488422 |
| 6795215 | 09/575109 | 6859289 | | | |

The disclosures of these co-pending applications are incorporated herein by cross-reference.

BACKGROUND

Systems have been proposed to enable printed substrates to be used interactively, in a manner similar to how computer displays are used interactively. By "interactively", we mean that the printed substrate includes visible human-readable information which, when "activated" by the user using an appropriate device, causes an action to occur in the system. Systems have been proposed in which pages are printed with machine-readable tags that are not discernable to the unaided eye of a human. These tags are typically printed over the entire surface of each page in a regular pattern. Each tag incorporates information, hereinafter referred to as a page ID, that differentiates each page from other pages and information, and information, hereinafter referred to as a location ID, that differentiates a subarea of the page associated with the tag from other subareas within each page. The association between the machine- and human-readable information is recorded in the system, and the system is thereby able to interpret actions performed relative to the substrate by the user using an appropriate tag-sensing device as actions relative to the human-readable information.

In our earlier application U.S. Ser. No. 09/575,187, we have proposed a printer which prints both the machine- and human-readable information simultaneously and a system that has the ability to print customized versions of documents, for example newspapers, for different customers. When the same printer prints the machine- and human-readable information, it is relatively simple to associate unique page and location IDs with the human-readable data. However, where pages are used with pre-printed or pre-formed tags it is necessary to associate each page with the data printed on a page-by-page basis. Even with mass production there is no certainty that a particular paper sheet will have particular information printed on it or that particular information will be printed on a sheet having a particular page ID or sheets having a particular range of page IDs.

SUMMARY OF INVENTION

The present invention enables association of the information of the page identification tags pre-printed or pre-formed onto a substrate with data identifying the, usually human-readable, information, both for customized print jobs and for mass-produced print jobs.

Accordingly, in one embodiment of the invention, a printer is provided which includes one or more sensors for detecting one or more page IDs on a page to be printed and stores or transmits the page ID or IDs back to the system to which it is connected. The system may associate the page IDs directly with the document information or it may associate page IDs with pointers to the document information. Different page IDs may be associated with the same print information. Whilst the system has more utility in printing of customized pages, it may still be used for mass-produced print jobs.

Accordingly the invention provides, in a first embodiment, a printer for printing document information onto one or more of a plurality of print areas, each of the print areas including identity data indicative of identity information which identifies the print area from others of the plurality, the printer including a sensor for sensing the identity information of the print area.

The invention also provides, in a second embodiment, a system for printing, the system including:
  a computer system;
  a printer for printing document information onto a print area, the print area including identity information which identifies the print area from other print areas including identity information, the printer including:
  at least one sensor for sensing the identity information of the print area;
  a transmitter for transmitting data to the computer system, the data selected from one of the following:
  the identity information,
  data representative of the identity information;
  the identity data, or
  data representative of the identity data,
  the computer system including:
  a receiver for receiving transmitted data, and
  means for generating association data representative of an association between the document data and the identity information, and
  memory for storing the association data.

The printer may be capable of printing on at least two of the print areas substantially simultaneously and preferably includes at least one sensor for each print area. The print areas may be side by side or on opposite sides of a sheet of paper or other substrate. Where a printer prints on two print areas substantially simultaneously a single sensor only may be used if assumptions are made as to the relationship between the identities of the two print areas. Deriving the identity of one print area thus allows one to derive the identity of the second print area based on the assumption.

The identity data is preferably represented on the print area in a coded from and preferably the printer includes a decoder which receives coded data from the sensor(s) and outputs decoded data representing at least the identity data or at least the identity information. The identity data may also include location data. The decoder may be at a remote location from the printer such as a network server.

The identity information of each print area may be represented by two or more physically discrete items of data and the decoder may output decoded data representing at least the identity data or the identity information after receiving the two or more separate items of data.

The sensors are preferably sensitive to electromagnetic radiation and detect the physical shape of the identity data on the print area. However the identity data may be represented in other ways, for instance using magnetic inks. In that case the sensors would need to be a magnetic sensors. Chemical marking may also be used.

The printer preferably includes a transmitter for transmitting information to a computer system. The transmitter may transmit the identity data or identity information to the computer system. The computer system preferably supplies document data representative of document information to the printer and associates the identity information with the document information.

The printer may also generate print information indicative of the information printed and may transmit this information to the computer system. The printer or system may include a user interface to enable a user to input the identity information or print information.

The printer may include means to detect failure to correctly print document information onto a print area, such as due to a paper jam, and be configured to transmit the void signal to the computer system together with the page ID (if not already transmitted). The computer system may then mark the relevant page ID as being void.

The sensors may be positioned to sense the identity data before or after printing of the document information on the respective print area.

The system may operate such that the printer derives and transmits identity data or identity information associated with a print area to the computer system prior to receiving document data associated with the print area. The document information may be based at least partially on document data received from a computer system.

The invention provides, in a third embodiment, a method of associating document information printed on one of a plurality of print areas with identity information which distinguishes the print area from others of the plurality, the method including:
  providing an print area having identity data on or in the print area, the identity data indicative of the identity information;
  providing a printer for printing said document information, the printer including:
  at least one sensor for sensing the identity data;
  a print mechanism for printing the document information, and
  a print area path which print areas to be printed follow, the print area path passing adjacent the sensor and through the print mechanism;
  passing the print area along the print area path and through the print mechanism and:
  sensing the identity data of the print area, and
  printing the document information onto the print area;
  deriving the identity information from the sensed identity data, and
  creating association data, associating the identity information with the document information.

The method may include providing document data to the printer, with the document information being at least partially based on the document data.

The identity data may be sensed before or after the document information is printed. Where the identity data is sensed before the information is printed and the document data may be at least partially based on the identity data.

The identity data is preferably carried by the print area in a coded data form and sensing the identity data includes sensing the coded data and decoding the coded data to extract the identity data or the identity information.

The method may include repeatedly printing the same information on different print areas and include generating an index signal to indicate a location in each of the repeats.

Each print area may comprise one discrete surface, such as a side of a sheet of paper, or may comprise a portion of a surface, such as part of a continuous strip of paper. Where continuous paper is used, the method includes sizing the print areas on the fly to accommodate different sized print jobs.

The method may derive the identity data from a single tag of the print area or derive the identity data from two or more tags.

The method may also include deriving data indicative of a reference point or zone within the print area.

BRIEF DESCRIPTION OF DRAWINGS

Preferred and other embodiments of the invention will now be described, by way of non-limiting example only, with reference to the accompanying drawings, in which.

DETAILED DESCRIPTION OF PREFERRED AND OTHER EMBODIMENTS

Figure 1:
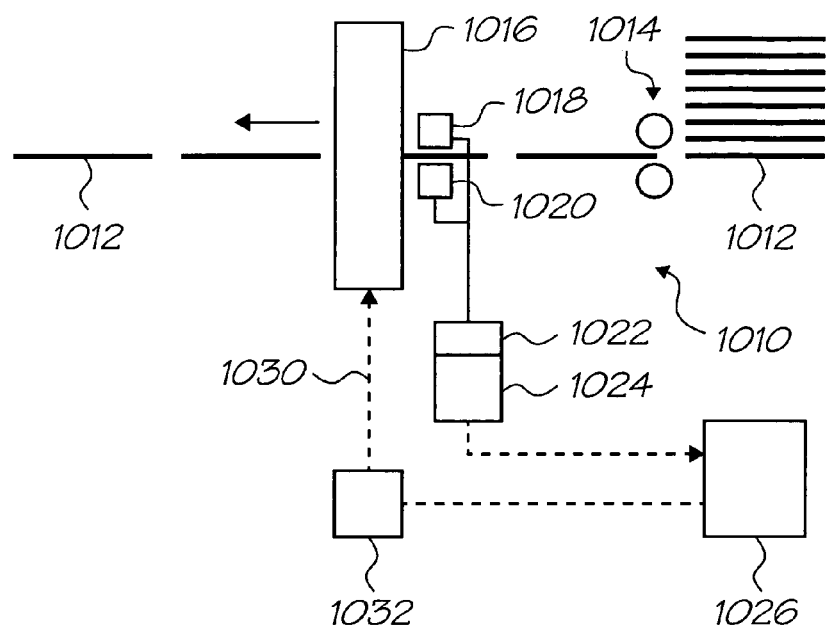
FIG. 1 shows a schematic side view of a printer according to a first embodiment of the invention.
Figure 2:
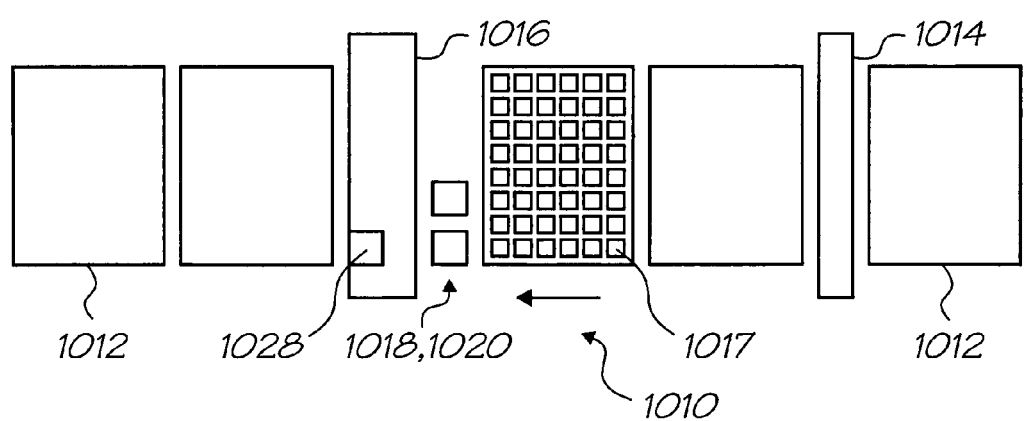
FIG. 2 shows a schematic plan view of the printer shown in FIG. 1.

A printer 1010 according to a first embodiment of the invention is shown schematically in FIGS. 1 and 2. The printer 1010 has a supply of cut paper 1012 and a paper feed mechanism 1014 for feeding sheets of paper 1012 a print mechanism 1016. The print mechanism 1016 may use any type of printing technology for "printing" of the, preferably human-readable, information since it is not required for printing of the, preferably invisible, machine-readable information. Examples of suitable print mechanisms include a laser print engine, a LED print engine, an ink jet print engine (thermal, piezo-electric, electrostatic, mechanical, MEMS), dot matrix, thermal dye sublimation, rotogravure or even a silkscreen printer.

Print mechanisms other than conventional ink deposition type print mechanisms mentioned above may be used. Examples of other types of print mechanisms include a Braille imprinting mechanism or use of thermal paper, such as used in older facsimile machines. In addition the sheets 1012 may be imprinted with electronically active inks and the print mechanism 1016 may be a device for selectively changing the state of the electronically active inks. For a better understanding of electronically active inks, reference is made to U.S. Pat. Nos. 6,017,584, 6,124,851, 6,120,839, 6,120,588, 6,118,426 and 6,067,185, all assigned to E Ink Corporation, the contents of which are included herein by reference. The printer mechanism 1016 prints on both sides of the paper in one pass but printing on a single side per pass is within the scope of the invention.

Each of the paper sheets 1012 is pre-printed or pre-formed with tags 1017 on at least one surface of each of the sheets 1012 with tags 1017 on each surface encoding a common page ID and each encoding a unique (on the surface) location ID. Whilst it is preferred that there is a one-to-one relationship between a page ID and a physical surface, this is not essential. A single surface may have more than one region, each with a different page ID. Similarly a single region having a single page ID may span more than one physically separate distinct surface, such as a number of sheets of paper. Tags at the same location on different surfaces have different page IDs but typically the same location ID. Page IDs are preferably unique to each surface but where not, two or more of the page ID and location IDs may serve to uniquely identify a page, as will be explained later. For a full explanation of tags, coding and physical structure of the tags, see our earlier applications U.S. Ser. No. 09/575,187, U.S. Ser. No. 09/575,154 and U.S. Ser. No. 09/663,701. The tags are preferably printed in a regular pattern on the surface of the sheet. The physical structure of each tag and the layout of the tags is not critical and the tags merely need to be at a sufficiently close spacing for the intended use and the capabilities of a sensing device used by the end user to detect the tags. Examples of suitable tag structures and layouts are found in our earlier applications, PCT specification No. PCT/US98/20597 and U.S. Pat. Nos. 5,625,412, 5,661,506, 5,477,012 and 5,852,434, the contents of which are included herein by reference. Suitable layouts include those in which the tags are centered on the vertices of triangles (regular, irregular, equilateral, isosceles etc), quadrilaterals (square, rectangle, parallelogram, rhombus etc), pentagons, hexagons and any other regular or irregular object having n vertices, where n is selected from 3 to infinity. It is not essential that the tags substantially cover the entire surface, although for convenience it is envisaged that most pre-printed or pre-formed sheets will have tags substantially covering all of both surfaces of each sheet. FIGS. 6 to 9 show three possible layouts of the tags, ranging from covering the entire surface though a strip of tags to a small area of tags, as shown in FIG. 9.

Preferably the page and location IDs are merely numbers, but other coding methods may be used, such as use of letters or other symbols rather than numbers. However since computerized systems generally store all information as binary numbers, a simple numbering system is more efficient. The page ID needs to have a sufficient precision for the intended purpose to uniquely identify the page within the scope of the environment within which the page will be used. It is presently believed that a 90-bit binary number will provide a sufficient number of page IDs to enable unique identification of a page on a worldwide basis. However this does not preclude use of greater or smaller precision.

Where the paper will not be used in an interactive manner but the tags are merely used to identify a particular page, the printing of multiple tags over the entire page may be unnecessary. Theoretically, a page could carry a single tag but this leads to potential problems associated with damage of the single tag, the detecting of a single tag or both. To avoid such problems a small area of the page may be printed with tags; for example a 5-by-5 square of tags could be printed in the corner or corners of the pages as shown in FIG. 9. Other locations are possible.

The printer 1010 includes two sets of sensors 1018 and 1020 arranged such that the paper sheets pass between the two sets of sensors with the sensors positioned to sense any tag information pre-printed or pre-formed on the respective adjacent face of the paper. Each set may consist of a single sensor or two or more sensors arranged across the paper path. Use of two or more sensors provides redundancy. The sensors may be similar to that disclosed in relation to the netpage pen disclosed in our earlier application U.S. Ser. No. 09/575,174. Preferably the pre-printed or pre-formed information is printed using an infrared-absorptive ink and so the sensor may be a charge-coupled device (CCD) or a CMOS image sensor sensitive to infrared light. This may be achieved by using a CCD or CMOS image sensor which is responsive only to infrared light or by providing a filter for a broad-spectrum sensitive CCD or CMOS image sensor. However any suitable image sensor may be used.

The tags need not be sensed using optical methods. For example, the invention includes within its scope the use of magnetic inks for the pre-printing of the tags. It will be appreciated that the sensor sets 1018 and 1020 used need to be appropriate for the type of inks used and if magnetic inks are utilized then the sensors need to be sensitive to magnetism and not electromagnetic radiation. Sensing methods other than magnetic and electromagnetic sensing may be used as desired or required. Other sensing systems include the use of different compounds to encode information, e.g. chemical coding and sensing.

It will be appreciated that the sensors are fixed relative to the paper path and so the process of interpreting the tag images is much simpler compared to a movable sensing device, such as a pen type device. Preferably the sensors are positioned so the tag image is projected onto the image sensor substantially undistorted and corresponding to viewing the tag at 90° to the paper path. If this is not possible then the techniques disclosed in our earlier applications U.S. Ser. No. 09/575,154 and U.S. Ser. No. 09/575,174 for correcting viewing at an angle may be utilized.

Printing or forming tags on both sides and having two sensors means that if visible printing occurs on only one side, the side with visible printing will always have tags on that side irrespective of how the paper is inserted into the printer. If the printer is only capable of printing on one side and the orientation of the paper can be guaranteed, such as by the use of a manufacturer-supplied cartridge of paper, then pre-printing of tags on only one side and having a single sensor will still be feasible.

It is preferable that the page ID for each page is derived from tags on the relevant surface. However, if there is a known relationship between two or more page IDs then deriving the page ID of one page allows one to derive the associated page IDs. For example, a sheet of paper may be encoded with tags on both sides with the page IDs of the two surfaces on a page being 2n and 2n+1 where n is any number. It follows that, knowing the relationship, one may sense either surface and derive the page ID of the other surface. Of course any relationship may be used; examples are 2n−1 & 2n and 2n & 2n+36. Thus in a system where there is always a known and unambiguous relationship between surfaces, a single sensor may be sufficient.

The sensor sets 1018 & 1020 are located upstream of the print mechanism 1016 such that the tag information may be sensed and decoded prior to the paper entering the actual print mechanism 1016. If desired the decoded information may be utilized to determine what is printed on the paper sheets. For example, with a customized newspaper as envisaged in our earlier applications, the layout of the human-readable information depends on the paper size and, if desired, the printer may be capable of printing on different paper sizes. Thus the paper size needs to be determined before the layout of the information to be printed is determined. Of course this is only practical if the print mechanism 1016 is capable of changing what is printed on the fly, such as any print mechanism in which the information printed is dependent on data received. It will be appreciated that where the information or the layout of the information printed is dependent on the page ID there is a relatively small window of opportunity between sensing and printing. If the layout is only dependent on the page ID then it is possible for the document data to be downloaded to the printer in advance with the printer only adjusting the layout in response to the page ID.

The tag information for each surface sensed by the respective sensor set is passed to a decoder 1022 within the printer to determine the page ID. This page ID is passed to a transmitter 1024 which in turn transmits the page ID to a storage device 1026. Since the pages 1012 are cut each page will preferably have tags which all encode a single page ID. Thus it is not important which particular tag on the page is sensed and decoded. However for error checking, the first and last tags on a page may be sensed. The storage device 1026 may be a network server or a local computer which associates the page ID with data 1032 relating to the information printed by the printer 1010. It will be appreciated that the association need not be directly with the information printed. This is particularly so where a single item of information, such as an image, is printed on many different pages. For data storage efficiency a single instance of the image may be stored and the association data merely includes a reference to the image. It will be appreciated that a distributed storage system may be utilized where the association data is stored at a physically different location from the actual document data. Examples include a separate hard drive on the same computer or a separate computer system on another continent.

The storage device 1026 may be a source of print data 1030 which the printer 1010 utilizes to print information onto the sheets 1012. Alternatively another computer may be the source of the print data 1030 and the data 1032 may be transmitted to the storage device for association with the page ID data. It will be appreciated that in the netpage system envisaged in our earlier applications where all devices connected to the network have a unique identifier, a first computer may send print data to a specific printer and then send data to a server relating to both the information printed and the printer to which the data had been sent. The print data 1030 sent to the printer 1010 may be based at least on part of the data 1032. Alternatively the data 1032 may be created separately, such as by manual data entry, particularly where the printer repeatedly prints the same information.

The transmitter 1024 may be connected to the storage device 1026 by wire or wireless means or a combination of both using conventional techniques. Wireless methods include infrared, radio and acoustic transmission. The protocols used for the transmission of the data are unimportant. Examples of suitable protocols include TCP/IP, IPX/SPX, NetBios and NetBEUI. If the printer 1010 is connected to the source of print data via the Internet, the tag information may be transmitted to the storage device 1026 via the Internet. It is preferable to decode some or all of the tag information at the printer so as to reduce the amount of data required to be transmitted. However, the tag information may be transmitted from the sensor to the storage device 1026 in its raw state with all decoding being carried out by the network server. Alternatively the printer may include a decoder which interprets the tag image, extracts the page ID and merely passes the page ID to the network server.

The printer 1010 also includes a paper jam sensor 1028 for detecting paper jams. Many current printers already include such sensors such that when a page is not printed correctly, the data is reprinted on a new page. In the event of a paper jam, the printer may transmit a "void" signal to the network server. Alternatively, when a page is successfully printed the printer may send a "success" signal to the network server. Where the information printed on the paper is not dependent on the page ID, the printer may merely hold the tag information or page ID in a buffer until the page is successfully printed and then transmit the information to the network server after printing. In these circumstances receipt of the coded information or the page ID would, by itself, be an indication of a successful printing of the data. Alternatively the page ID and the "success" signal may be transmitted, either using a single transmission or using two separate transmissions.

The printer may be connected to a local computer that sends print jobs to the printer in addition to or as an alternative to a network server. With suitable software, information relating to local print jobs and page IDs may be transmitted to the network server such that the local print jobs may be used interactively at other locations without the need for the local computer to be turned on or to be connected to the network. The local computer may store information relating to local print jobs and page IDs etc. when offline and transmit such data to the server when next online.

Figure 3:
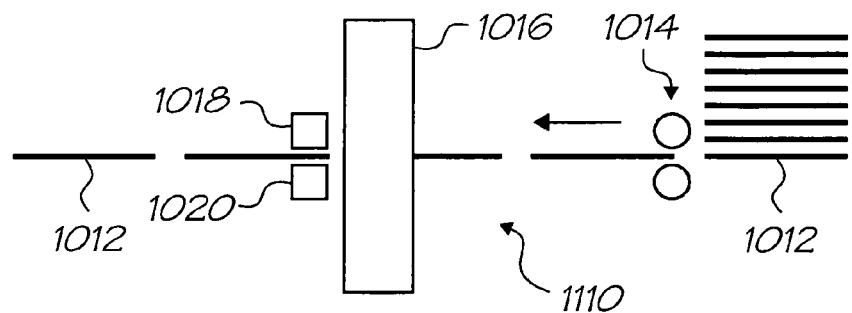
FIG. 3 shows a schematic side view of a printer according to a second embodiment of the invention.
Figure 4:
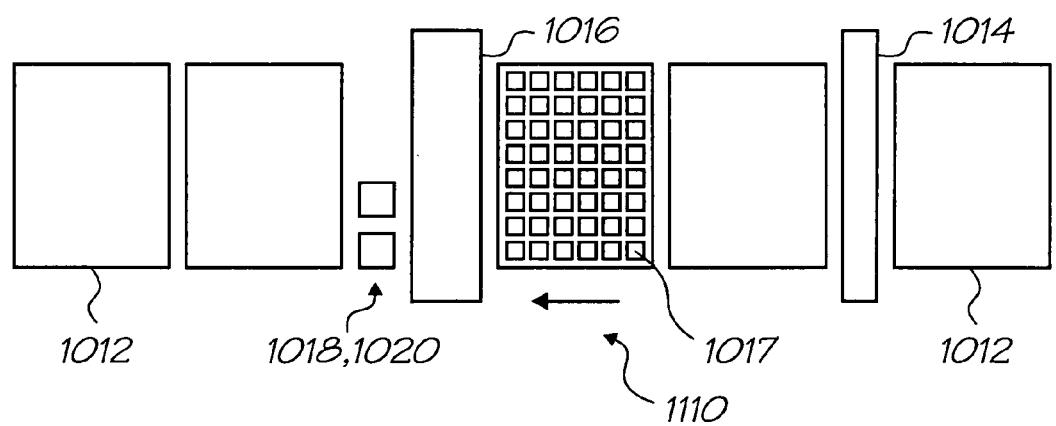
FIG. 4 shows a schematic plan view of the printer shown in FIG. 3.

FIGS. 3 and 4 schematically show a printer 1110 according to a second embodiment of the invention. The printer 1110 is substantially the same as the printer 1010 of FIGS. 1 and 2 and accordingly the same numbers are used for similar components. The printer 1110 differs from that of FIGS. 1 and 2 in that the sensors 1018 and 1020 are located downstream of the print engine. Accordingly, the printer 1110 is not capable of sensing a page ID before the page is printed; however, by use of other sensors, page size may still be sensed, as in conventional printers. The printer 1110 operates similarly to that of FIGS. 1 and 2 in that the coded information pre-printed or pre-formed on the paper is sensed, decoded and associated with information relating to the data printed by the printer 1110. Locating the sensors 1018 and 1020 downstream of the print engine 1016 means that paper jams within the print engine do not need to be addressed in relation to associating the correct page IDs with the information printed. Conversely, pages "voided" by paper jams cannot be detected.

Whilst the use of cut sheets of paper is the preferred method of implementing the invention, the invention includes within its scope use of uncut continuous paper. The use of continuous paper may be commercially necessary for the production of mass-produced items, such as lottery type tickets or merely the provision of an interactive newspaper which is produced and distributed in the current manner. Variations of the netpage printer utilize a roll of continuous paper together with a paper cutter and so such printers may be modified to include one or more sensors to detect pre-printed or pre-formed tags on continuous paper. Other applications which may utilize continuous paper with pre-printed or pre-formed tags include portable printers and cameras which include printers. Examples of these are discussed in our earlier applications U.S. Ser. No. 09/575,146 and U.S. Ser. No. 09/608,920. The devices of U.S. Ser. No. 09/575,146 and U.S. Ser. No. 09/608,920 may be modified to incorporate tag sensors and other hardware to enable derivation and transmittal of identity data or information for association with document data. In the case of a camera, the camera may transmit the image printed to a network server or it may store the association data in itself. The camera may include a user input to enable the user to input information relating to the images, such as a brief description or an audio annotation. This information may also be associated with the identity information.

The use of continuous paper presents problems in that the paper is usually printed and then cut and so the length of pages between print jobs may vary. In addition, if tags are printed over substantially all of a surface there is no certainty that a finished printed page will have tags that all encode the same page ID. In fact, it is extremely unlikely that this would be the case. As such, a single page ID, by itself, is insufficient to identify a page since the same page ID will probably be encoded in tags occurring on two or more pages. However the use of page IDs and location IDs together in a single tag or tag location, as proposed in our earlier applications together provide the ability to identify the finished printed pages.

Assuming that page IDs are pre-printed or pre-formed sequentially and location IDs follow a known sequence between each increment in page ID then recording or deriving the first and last page ID and location ID pairs for each page enables the system to record the extent of each of the printed pages. Thus it is possible to identify or derive the physical location of given any page ID and location ID pair. The physical dimensions on the continuous paper at which page IDs increment need not be fixed for all applications. The continuous paper may be supplied with page IDs incrementing at separations corresponding to A4 or A3 sizes, for example. However, since each page ID and location ID pair is a unique identifier, there is no need to match the location ID repeat dimension with the expected printed page length. If the repeat dimension is known, then a first page ID and location ID, together with a particular page length, are sufficient to determine the page ID and location ID "extent" of the page.

It will be appreciated that for continuous media the page ID and location ID have no significant meaning as separate items and only have significant meaning when combined together. The location IDs need not consist of a series of sequential numbers within the one page ID region. As an alternative, the location IDs may represent an offset in the X and Y dimensions of the surface. As such there may be jumps in the values of the location IDs, for example if the actual page width is less than the page width allowed for in the X dimension of the location IDs.

Figure 5:
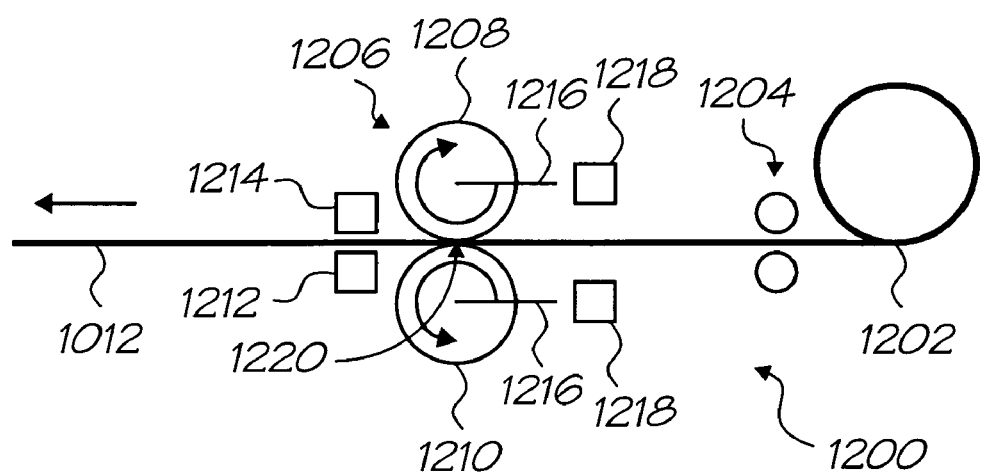
FIG. 5 shows a schematic side view of a printer according to a third embodiment of the invention.

FIG. 5 schematically shows a printer 1200 according to a third embodiment of the invention. The printer 1200 includes a roll of continuous paper 1202, a paper feed mechanism 1204 and print mechanism 1206. In this embodiment the print mechanism 1206 is a rotary type printer having opposed print rollers 1208 & 1210 that print on both sides of the paper, such as those used for printing of newspapers. Whilst only one pair of rollers is shown, it will be appreciated that multiple pairs may be used, particularly if multiple colors are to be printed. Whilst a rotary type print mechanism is shown, it is to be appreciated that an on-demand type print mechanism which prints different information in response to received data, such as a laser print engine, may also be used with continuous paper.

Located downstream of the print rollers are two sets of tag sensors 1212 & 1214, on either side of the paper. As in the other embodiments each set may be comprised of a single sensor or may be comprised of multiple sensors. The rollers 1208 and 1210 include one or more index points 1216 such that index sensors 1218 may sense the position of the rollers. Where a single index point is provided on each roller, the index sensor 1218 is only capable of sensing when the roller is at only one particular orientation; multiple index points spaced equally around the axis of rotation allow the sensors to determine when the roller is at one of many orientations. Use of a unique index point associated with the start of the page of information to be printed allows the system to associate the page IDs with the printed information.

As discussed above, use of continuous paper means that the start of each page is not known. The physical offset of the tag sensors 1212, 1214 and index sensors 1218 from the point of printing 1220 is known; use of the index point or points 1216 enables the start of each page printed to be known, which together with the known offsets allows the first page ID for the page to be derived. For example, assume the effect of tag sensor position and index sensor position is that the paper moves 10 rows of tags after the index sensor detects the start of the page before that point passes between the sensors. The system may derive the page ID and location ID of the first tag on the page by adding or subtracting the equivalent of 10 rows of tag numbers to the page ID and location ID combination sensed by the tag sensor when the index sensor senses the index point. Alternatively, the system may count 10 rows of tags passing between the tag sensors and then read the tag corresponding to the start of the page. It will be appreciated that with a rotary press, the end of a page immediately precedes the start of the subsequent page and so a single tag sensor reading may be used to delineate the start and ends of adjacent pages.

Figure 6:
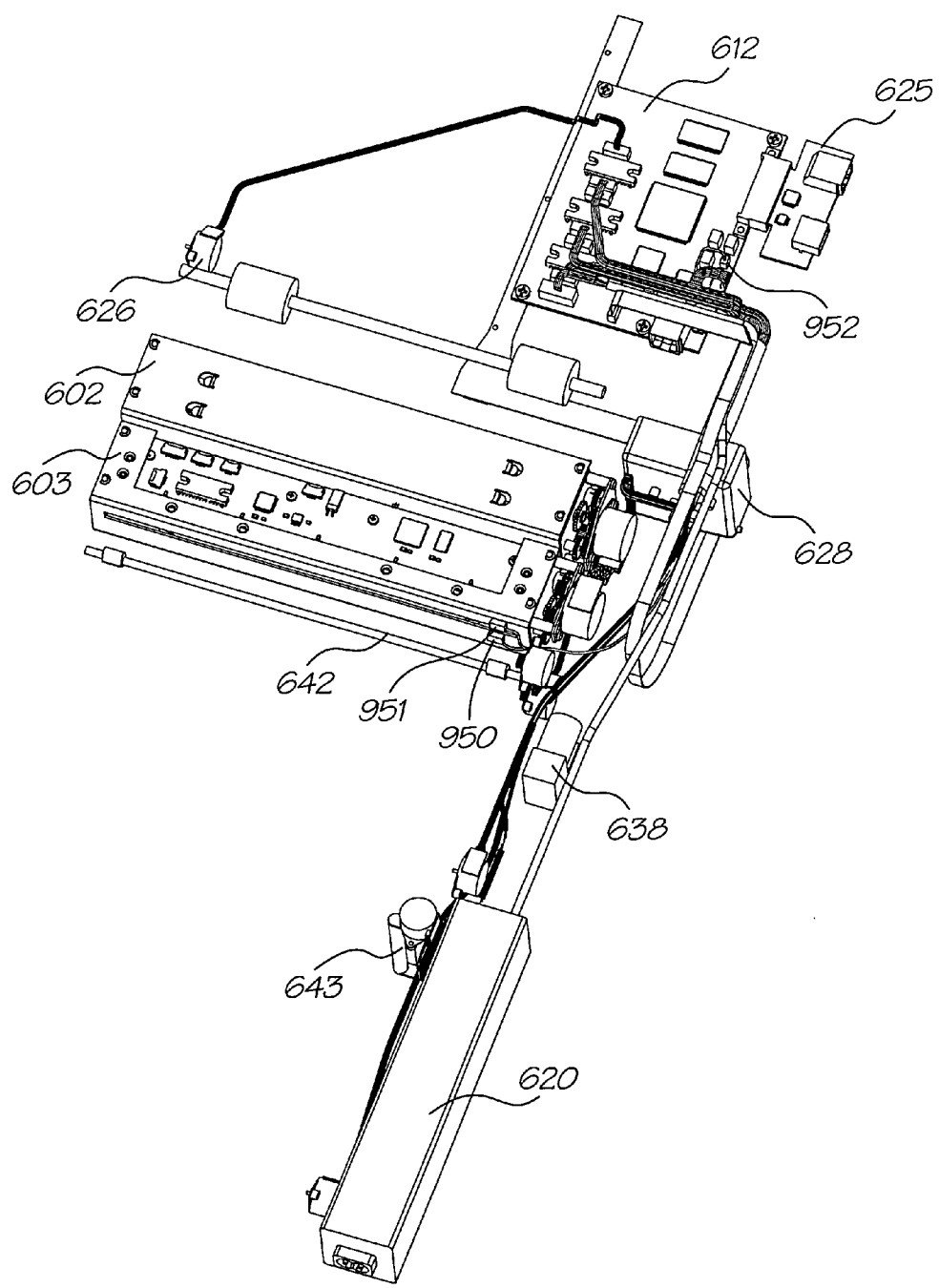
FIG. 6 shows a rear three-quarter view of the electrical system of a netpage printer according to the invention.

FIG. 6 shows a modified netpage printer 601 that incorporates the present invention. For a full description of the netpage system, including the netpage printer and pen, reference is made to earlier U.S. applications U.S. Ser. No. 09/575,129, U.S. Ser. No. 09/575,155 and U.S. Ser. No. 09/575,174.

The printer 601 includes two sensors 950 & 951 which are mounted downstream of the print mechanisms 602 and 603. The two sensors are located such that paper passes between the sensors as it exits the print mechanisms and so that each sensor may sense appropriate tags on the paper. The sensors 950 & 951 are located adjacent the registration line of the printer such that if different width papers are used in the printer the paper will always pass between the sensors. The tags pre-printed or pre-formed on the paper are preferably printed in infrared-absorptive inks that are not visible to the unaided eye of a human. Accordingly the sensors 950 and 951 are optical image sensors sensitive to infrared light. It will be appreciated that sensing at other wavelengths of light may be used as desired or required by the substrate and ink combination. The use of inks that are visible to the aided or unaided human eye is not precluded.

The sensors 950 & 951 detect the page IDs downstream of the two print mechanisms 602 and 603 and pass the information detected to a decoder in the printer controller similar to the decoder utilized in the netpage pen, also discussed in U.S. applications U.S. Ser. No. 09/575,129 and U.S. Ser. No. 09/575,174. It will be appreciated that a separate transmitter is not required to return page IDs to the network server and that the data path used to receive data from the network may be used to return the page IDs to the network server.

Figure 7:
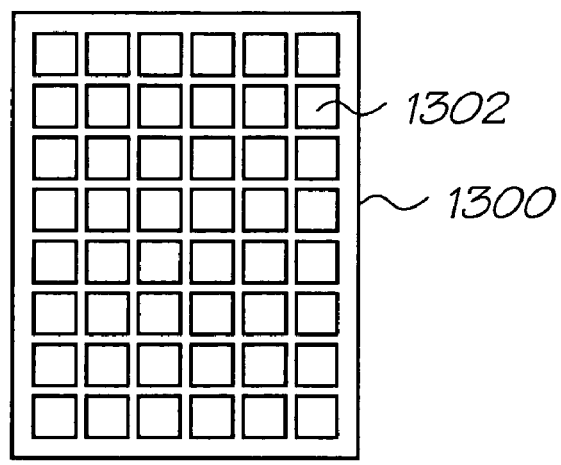
FIG. 7 shows sheet of paper pre-printed or pre-formed with tags in a first layout.

FIG. 7 shows a page 1300 pre-printed or pre-formed with tags 1302 for use with the invention. For clarity fewer tags are shown than are actually printed or formed on the page than in practice and each is shown proportionally larger relative to the page. The tags 1302 are in a regular pattern over substantially the entire surface of the page 1300. In the page shown the tags 1032 are in a rectangular grid arrangement, but as discussed earlier, other arrangements may be used.

Figure 8:
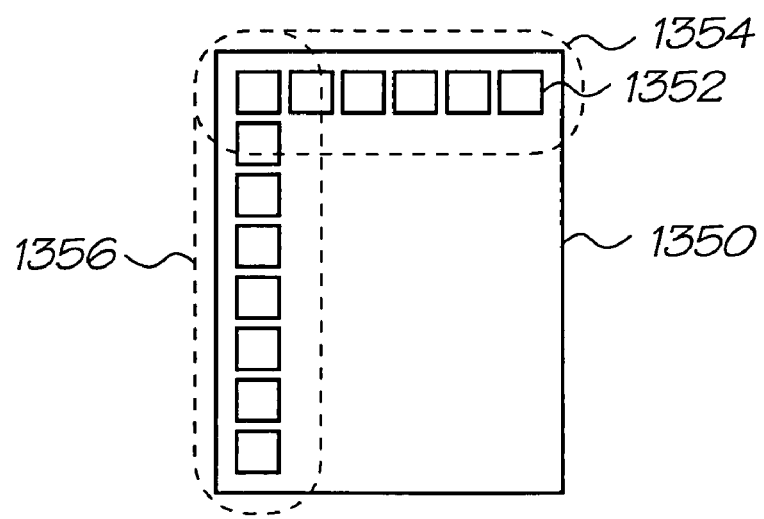
FIG. 8 shows sheet of paper pre-printed or pre-formed with tags in a second layout.
Figure 9:
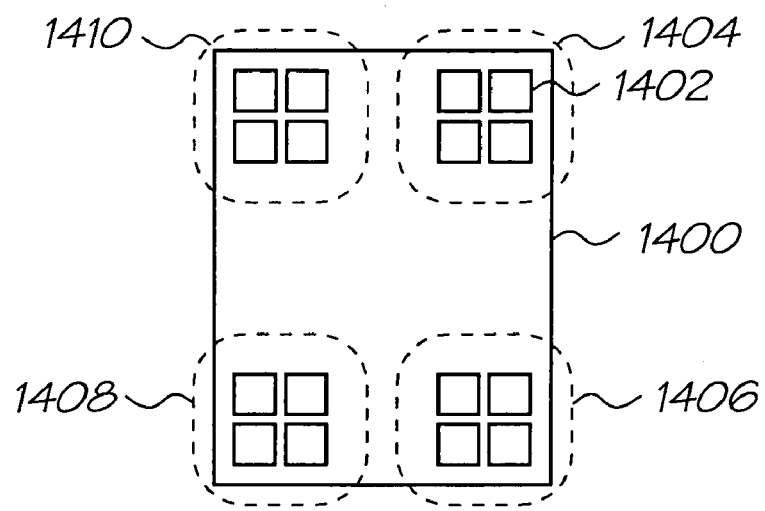
FIG. 9 shows sheet of paper pre-printed or pre-formed with tags in a third layout.

FIG. 8 shows a page 1350 pre-printed or pre-formed with tags 1352 for use with the invention. The tags 1352 are in a regular pattern in two strips 1354 and 1356. For clarity only some of the tags are shown. The first strip 1354 runs along substantially the length of the page 1350 while the other strip 1356 runs along substantially the width of the page 1350. Whilst not shown, the tags 1352 in each strip may be arranged in any suitable layout. The page 1350 is not capable of being used interactively, except where tags exist, but does provide to ability to identify each page. The strips ensure that at least one tag will be sensed no matter the orientation of the paper relative to the printer.

FIG. 9 shows a page 1400 pre-printed or pre-formed with tags 1402 for use with the invention. The tags 1402 are in a regular pattern in each of four areas 1404, 1406, 1408 and 1410. Each of the areas 1404, 1406, 1408 and 1410 is located in a corner of the page 1400. Again the tags 1032 in each area may be arranged in any suitable layout. The page 1400 is not capable of being used interactively, except where tags exist but does provide to ability to identify each page. To ensure that the printer senses at least one tag, two sensors are required, so as to detect a tag in both the portrait and landscape orientations.

Figure 10:
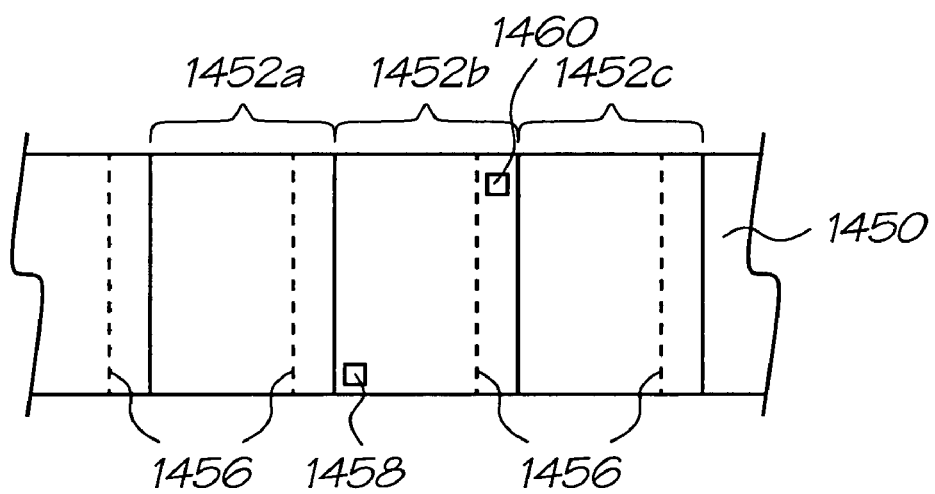
FIG. 10 shows a portion of a printed strip of paper with multiple pages printed continuously along the strip.

FIG. 10 shows a portion of a continuous strip 1450 of paper on which "pages" 1452a, b & c have been printed prior to separation of the strip 1450 into individual items along lines 1454. The strip has tags (not shown) over substantially the entire surface. The tags encode page IDs and location IDs with the page IDs incrementing at regular intervals. For clarity the points at which the page IDs increment are delineated by dotted lines 1456. As discussed earlier, the first and last tags 1458 & 1460 of each page have unique combinations of page ID and location ID and so together delineate each page.

Figure 11:
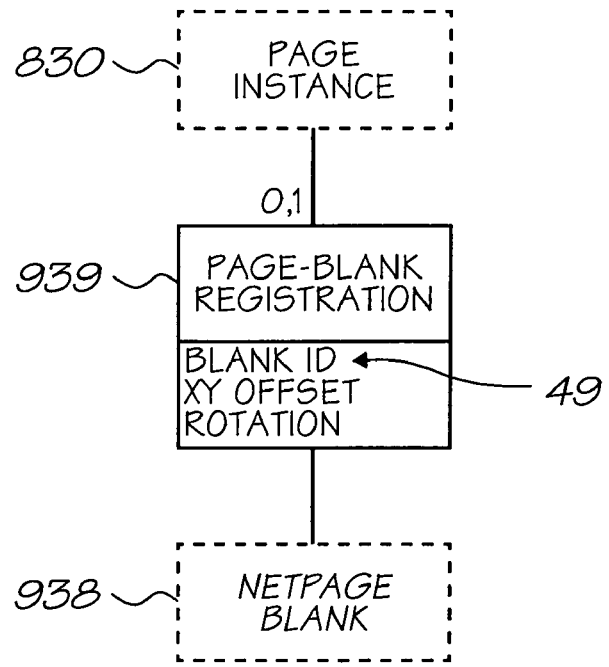
FIG. 11 shows a class diagram of a netpage page instance according to the invention.
Figure 12:
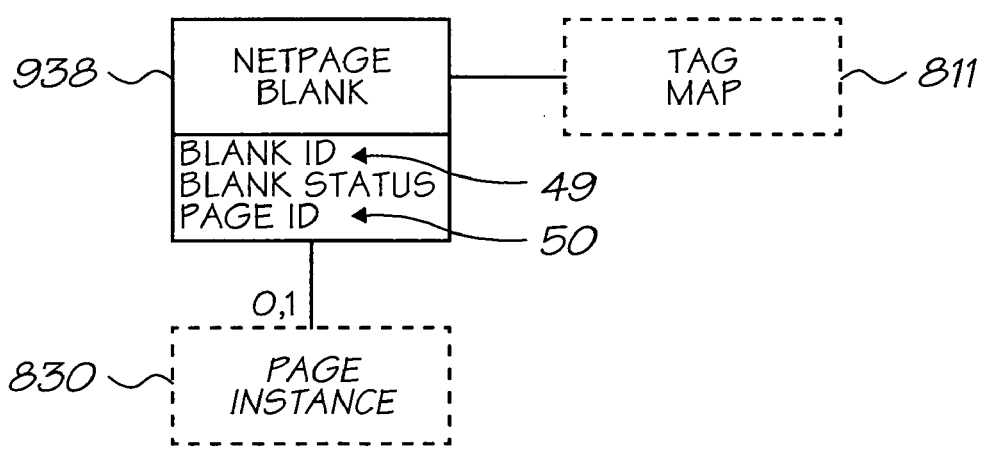
FIG. 12 shows a class diagram of a netpage blank according to the invention.

The netpage system maintains association data between physical tagged pages and document data in the form of page instances maintained by a page server. For a full description of the netpage system, including the netpage printer and pen, reference is made to earlier U.S. applications U.S. Ser. No. 09/575,129, U.S. Ser. No. 09/575,155 and U.S. Ser. No. 09/575,174. FIG. 11 shows a class diagram for a modified netpage page instance 830 which allows the association to be made between document data and a pre-printed or pre-formed "blank" 938. FIG. 12 shows a class diagram for the netpage blank 938.

In the netpage system, each blank is managed by a page server whose identity is determined from the blank ID 49 in the usual way via the DNS. When the blank is first produced its status is recorded as "not in use". When graphic content is printed onto the blank, its status is changed to "in use", and the page ID 50 of the corresponding page is recorded in the blank record maintained by the blank's page server.

A blank may be managed by a page server which is different from the page server which manages the page content printed onto the blank. The page server which manages the page content records the relationship between the page and the blank in a page-blank registration record 939 (in FIG. 11). This contains, in particular, the displacement and rotation of the page content with respect to the blank's tags, as determined during page printing, allowing tag-relative positions to be correctly translated into page space. The tag map associated with the page instance is derived from the tag map 811 associated with the blank.

The displacement and rotation of the page content with respect to the blank's tags need not be recorded if the blank production process guarantees that the tags have a known fixed relationship with the physical sheet. In this case the tag map alone is sufficient. This is only true, of course, if the printer also guarantees registration between the page content and the physical sheet.

When a user interacts with a page printed on a blank, the printer through which the user is interacting first identifies the blank's page server from the blank ID 49, and then, via the blank's page server, obtains the page ID 50 of the page content and thereby identifies the page content's page server. The printer caches the network address of the page content's page server, so that it only needs to communicate with the blank's page server when it first encounters the page.

When tags are printed on demand, the degenerate page-blank relationship can be thought of as existing where the blank ID and the page ID are identical and there is no displacement or rotation of the page content with respect to the tags.

Whilst the invention has been described mainly with reference to conventional paper with the identity data printed on the surface of the paper and the human-readable information being displayed using "ink" on the paper surface, it is to be appreciated that the invention is not limited to these implementations. For example, a single or multi-layered plastics sheet may be used as the substrate. The identity data or the human-readable information or both may be represented on the substrate by modifying the topography of the surface of the substrate. This may be by generating depressions in or protrusions on the general plane of the substrate. The identity data may be located within the body of the substrate rather than on the surface. For example the substrate may be constructed in a similar manner to CDs and DVDs in having one or more internal layers which encode information on or in the internal layer(s). The identity data may also be represented by apertures extending through the substrate.

As mentioned earlier it is possible to utilize substrates with "electronic" ink, in which the printer does not necessarily deposit any ink on the substrate but merely changes the state of elements of the substrate to change the visual appearance of the substrate. It will be appreciated that a printer may be capable of "printing" a substrate using conventional ink deposition type technologies together with non deposition type technologies, such as the electronic ink system or thermal printing.

The printer of the present invention may also be used as an eraser device to render information on a substrate unreadable, either by a user or by a machine, if it has an "erase" mode. When in the "erase" mode, upon insertion of a substrate carrying printed information and identity data, the printer senses the identity data. The system knows what is printed on the substrate due to the existing association of the identity information and the document data. Where the printer is an ink deposition type printer, all areas having no ink may be printed to render the entire surface of the substrate black. Where the substrate carries colored information, the printer may be caused to over-print all of the surface with various colors so the addition of the new ink and the existing ink results in a black image. Since the exact colored dot image of the page is known via the association data and the document information, the printer may be caused to print an exact dot-wise reverse of the current image to effect "erasure". Alternatively the printer may overprint the entire surface with black ink or meaningless information to render the original information unreadable. A thermal type printer may heat all of the substrate to render the surface black.

Where the substrate carries electronic ink, erasure is merely a matter of switching the state of the elements to a single common state and so effectively removing the print information carried by the sheet.

The printer may have a number of erase modes. In the first mode, the printer may merely render the physical page unreadable whilst leaving the association data and document data on the network. In this case the document is reproducible from the network. In the second mode the system deletes the association data and optionally the document data. In these circumstances the document is not reproducible from the network. Use of the second mode will require authorization to prevent a permanent deletion of a document. In addition the document data may only be deleted if authorized and if there are no other associations with the particular document data. As an example, an image may be shared between multiple physical pages. Deletion of the image on the network system is not possible as this would destroy the effect of the association data for all pages which include the image.

The invention also includes within its scope a shredding device with a sensor for detecting identity data carried by a substrate and a shredding mechanism for physically shredding the actual substrate. On insertion of a sheet into the shredder, the identity data or identity information is derived and passed to the network, thereby enabling the network system to record destruction of the physical substrate, deletion of the association data and deletion of the association data and the document data. As with the printer, the shredder may have various modes.

Physically shredding a multi-page document need not necessarily require feeding of each page into the shredder separately. The system knows, for instance, that a twenty-page document is printed on twenty separate sheets. Sensing the identity data of a single one of those twenty sheets identifies the entire twenty-page document and it may be assumed that the entire twenty pages are being shredded. The twenty sets of association data may be accordingly modified.

Whilst the invention has been described with reference to devices which include a sensor device in a fixed position which automatically sense the identity data as a sheet or sheets passes through the device, it is within the scope of the invention for the devices to include a hand-held and -operated sensing device. Such a sensing device may be connected to the device directly or indirectly by wires or wireless means. In use the user swipes the sheet to be acted on, retrieving the identity information. The netpage pen as described in our earlier applications may be used as the sensing device.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A system for creating interactive print media, the system including:
   a) a computer system; and
   b) a printer including:
      i) a feed mechanism for feeding print media through a media feed path;

ii) a print mechanism for printing document information onto a print area provided on said print media, the print area including identity data indicative of identity information which differentiates the print area from other print areas including identity data;

iii) at least one sensor positioned adjacent said media feed path, said at least one sensor being configured such that all print media on which said print mechanism has printed said document information are automatically sensed by said at least one sensor;

iv) a decoder which receives coded data from the at least one sensor and outputs decoded data;

iv) a transmitter for transmitting the decoded data to the computer system, the transmitted data being selected from one of the following:
  (1) the identity information,
  (2) data representative of the identity information;
  (3) the identity data, or
  (4) data representative of the identity data, the computer system including:
  i) a receiver for receiving the transmitted data, and
  ii) means for creating association data using said transmitted data, said association data being representative of an association between the document information and the identity information;
  iii) memory for storing the association data, said memory being accessible via subsequent interactions with said print media so that said print media are interactive from a user's point of view.

2. The system of claim 1 wherein each identity information is represented on the print area by at least two physically discrete items of identity and the decoder outputs decoded data representing at least the identity information after receiving said at least two separate items of data.

3. The system of claim 1 wherein said at least one sensor is positioned to sense said identity data after printing of the document information on the respective print area has commenced.

4. The system of claim 1 wherein said at least one sensor is positioned to sense said identity data before printing of the document information on the respective print area has commenced.

5. The system of claim 1 wherein said at least one sensor is positioned to sense said identity data during printing of the document information on the respective print area.

6. The system of claim 1 further including means to detect failure to correctly print document information onto a print area and for generating a void signal on detection of said failure to the computer system.

7. The system of claim 1 wherein said document information is based at least partially on document data received from the computer system.

8. The system of claim 1 wherein said printer derives and transmits identity data or identity information associated with a print area to the computer system prior to receiving document data associated with said print area.

9. The system of claim 1 wherein said document data is based at least partially on the identity information.

10. The system of claim 1 operable to over-print a print area having existing document information to render the existing document information unreadable.

11. The system of claim 10 wherein the association data is modified to include information indicating the document information of the print area is unreadable.

12. The system of claim 10 operable to over-print a print area having existing document information to render the existing document information unreadable and to delete the association data associated with the print area.

13. The system of claim 10 operable to over-print a print area having existing document information to render the existing document information unreadable and to delete the association data associated with the print area and the document data associated with the association data.

14. The system of claim 1 wherein the printer includes a print mechanism for printing on at least two print areas simultaneously.

15. The system of claim 1 wherein the at least one sensor is selected from an image sensor and a magnetic sensor.

16. The system of claim 1 wherein the printer generates print information indicative of the information printed.

17. The system of claim 1 further including a user interface to enable a user to input identity information into the system.

18. A method of creating interactive pages by associating document information printed on one of a plurality of print areas with identity information which differentiates the print area from others of the plurality, the method including:

a) providing a print area on a print medium, said print area including identity data indicative of the identity information;

b) providing a printer for printing said document information, the printer including:
  i) a feed mechanism for feeding print media through a media feed path;
  ii) a print mechanism for printing the document information;
  iii) at least one sensor positioned adjacent said media feed path, said at least one sensor being configured such that all print media on which said print mechanism has printed said document information are automatically sensed by said at least one sensor;

c) passing the print media along the media feed path through the print mechanism and past the at least one sensor, and:
  i) printing the document information onto the print area;
  ii) automatically sensing the identity data of the print area, and d) deriving the identity information from the sensed identity data;

e) creating association data using the derived identity information, said association data associating the identity information with the document information; and f) storing the association data in a memory, said memory being accessible via subsequent interactions with said print media so that said print media are interactive from a user's point of view.

19. The method of claim 18 wherein the identity data is carried by the print area in a coded data form and sensing the identity data includes sensing the coded data and decoding the coded data to extract the identity data.

20. The method of claim 18 further including providing document data to the printer, said document information being at least partially based on the document data.

21. The method of claim 18 wherein the identity data is sensed after printing of the document information has commenced.

22. The method of claim 18 wherein the identity data is sensed while the document information is being printed.

23. The method of claim 18 further including detecting failure to correctly print document information onto a print area and for associating a void flag with the identity information.

24. The method of claim 18 wherein the print mechanism repeatedly prints the same information on different print areas and includes an index signal generator to indicate a location in each of the repeats.

25. The method of claim 18 wherein the plurality of print areas are located on one or more substrates and at least one surface of each substrate constitutes a separate print area.

26. The method of claim 18 wherein the plurality of print areas are located on one or more substrates and at least one surface of each substrate constitutes a plurality of separate print areas.

27. The method of claim 18 wherein the plurality of print areas are located on one or more substrates, at least one surface of each substrate constitutes a plurality of separate print area and wherein at least one dimension of each print area is of variable size, the size of the at least one dimension defined during the printing process at least partially in response to the document data.

28. The method of claim 18 wherein a print area includes at least one tag which includes a unique code.

29. The method of claim 18 wherein each print area includes a plurality of tags, each of which includes a unique code, each of the unique codes including the identity data.

30. The method of claim 18 wherein a print area includes a plurality of tags, each of which includes a unique code, the identity information of the print area being derived from at least two of the unique codes.

31. The method of claim 18 wherein a print area is defined by information encoded by two or more separate tags.

32. The method of claim 18 wherein each tag is also indicative of a reference point or zone within the print area.

33. The method of claim 18 including over-printing a print area having existing document information to render the existing document information unreadable.

34. The method of claim 18 including modifying the association data to include information indicating the document information of the print area is unreadable.

35. The method of claim 18 including over-printing a print area having existing document information to render the existing document information unreadable and deleting the association data associated the print area.

36. The method of claim 18 including over-printing a print area having existing document information to render the existing document information unreadable and to deleting the association data associated the print area and the document data associated with the association data.

37. The method of claim 18 wherein the print mechanism includes a laser print engine, a LED print engine, an ink jet print engine, a dot matrix print engine, a thermal dye sublimation print engine, a roto gravure print mechanism or a silkscreen printer.

38. The system of claim 1, each print area including identity data indicative of an identity of the respective print area.

39. The method of claim 18, each print area including identity data indicative of an identity of the respective print area.

* * * * *